US 008694181B2

(12) United States Patent
Horner et al.

(10) Patent No.: US 8,694,181 B2
(45) Date of Patent: Apr. 8, 2014

(54) CABIN PRESSURE CONTROL SYSTEM WITH MULTIPLE OUTFLOW VALVES AND METHOD OF CALIBRATING THE OUTFLOW VALVE POSITION FEEDBACK DURING FLIGHT

(75) Inventors: Darrell Horner, Oro Valley, AZ (US); Timothy Biss, Tucson, AZ (US); Gerard McCoy, Tucson, AZ (US); Tim Hilzendeger, Oro Valley, AZ (US); Joaquin Rabon, Tucson, AZ (US); Timothy R. Arthurs, Tucson, AZ (US)

(73) Assignee: Honeywell International Inc., Morristown, NJ (US)

( * ) Notice: Subject to any disclaimer, the term of this patent is extended or adjusted under 35 U.S.C. 154(b) by 229 days.

(21) Appl. No.: 13/417,746

(22) Filed: Mar. 12, 2012

(65) Prior Publication Data

US 2013/0233408 A1    Sep. 12, 2013

(51) Int. Cl.
*B64D 13/02* (2006.01)
(52) U.S. Cl.
USPC .................................................. 701/3; 454/74

(58) Field of Classification Search
None
See application file for complete search history.

(56) References Cited

U.S. PATENT DOCUMENTS

| 5,273,486 A * | 12/1993 | Emmons et al. ............... 454/74 |
| 7,686,680 B2 | 3/2010 | Horner et al. |
| 2003/0157875 A1 | 8/2003 | Horner et al. |
| 2008/0233854 A1* | 9/2008 | Horner et al. ................... 454/74 |
| 2010/0173575 A1 | 7/2010 | Horner et al. |

* cited by examiner

*Primary Examiner* — Michael J Zanelli
(74) *Attorney, Agent, or Firm* — Shimokaji & Associates, P.C.

(57) ABSTRACT

A method of calibrating an outflow valve on an aircraft may include determining if the aircraft has reached a predetermined cruise condition. The outflow valve may be moved until a closed position is reached, if the aircraft has reached the predetermined cruise condition. An actual position feedback value of the outflow valve may be determined while the aircraft is in the predetermined cruise condition. An offset calibration factor may be determined from the actual position feedback value of the outflow valve relative to a theoretical value.

20 Claims, 4 Drawing Sheets

CABIN PRESSURE CONTROL SYSTEM WITH MULTIPLE OUTFLOW VALVES AND METHOD OF CALIBRATING THE OUTFLOW VALVE POSITION FEEDBACK DURING FLIGHT

BACKGROUND OF THE INVENTION

The present invention generally relates to aerospace systems, and more particularly, to a cabin pressure control system with multiple outflow valves and a method of calibrating the outflow valve position feedback during flight.

Some aircraft have multiple outflow valves (OFVs) that are controlled together to effect an airflow proportional bias between them. Sometimes large aircraft have two OFVs, but some have more. For accurate flow biasing, which may be required over the full range of airflow available from the engines and over the varying commanded proportions from the ventilation control system, very accurate calibration of the OFV position sensors is required.

This can result in costly position feedback components, expensive high precision circuitry to read the output, and difficult/costly calibration procedures; either in the shop or on the airplane.

However, often the valve position sensor cannot be calibrated accurately enough to maintain proper OFV biasing. Further, circuit errors may contribute to OFV position error. Additional errors due to temperature effects or circuitry component drift over time may cause improper operation of OFVs.

Additional errors may be introduced for thrust recovery valves (TRV). For example, if the OFVs are TRV type, then they are mounted on the skin of the airplane. TRVs have multiple loads on the valve due to aerodynamic effects. Therefore, the doors of the valve may deform during flight creating position error of the TRV. Further, TRVs often have linkages between the rotary actuator and the valve doors. These linkages may have variation in them (including effects of wear over time), and there are secondary effects that cause additional errors in the position sensor, (which may be mounted on the rotary actuator shaft) and the actual door positions.

As can be seen, there is a need for an improved method of calibrating outflow valve position on an aircraft.

SUMMARY OF THE INVENTION

In one aspect of the present invention, a method of calibrating an outflow valve on an aircraft includes determining if the aircraft has reached a predetermined cruise condition; moving the outflow valve until a predetermined closed position is reached, if the aircraft has reached the predetermined cruise condition; determining an actual position feedback value of the outflow valve while the aircraft is in the predetermined cruise condition; and determining an offset calibration factor from the actual position feedback value of the outflow valve relative to a theoretical value.

In another aspect of the present invention, a method of calibrating outflow valves on an aircraft includes controlling a position of a first outflow valve using a first command channel; determining if the aircraft is in-flight; moving the first outflow valve with the first command channel until a closed position is reached while the aircraft is in-flight; determining an actual position feedback value of the first outflow valve; and determining an offset calibration factor for the first outflow valve based on a difference between the actual position feedback value of the first outflow valve and the theoretical feedback value at the closed position.

In yet another aspect of the present invention, an outflow valve control system in an aircraft includes an outflow valve on the aircraft; a motor coupled to the outflow valve; a valve position sensor coupled to the outflow valve; an outflow valve controller configured to control the motor and read the valve position sensor; and a central processing unit (CPU) including control logic and non-volatile memory connected to the controller, configured to: control the controller to move the outflow valve into a closed position; read the valve position sensor; determine if the outflow valve is in the closed position; determine an actual valve position sensor feedback value of the outflow valve in the closed position when the aircraft is in-flight; determine an offset calibration factor of the outflow position valve based a difference between the theoretical feedback value at the closed position and the actual valve position feedback value; store the calibration factor in the non-volatile memory; and move the outflow valve according to the calibration offset factor.

These and other features, aspects and advantages of the present invention will become better understood with reference to the following drawings, description and claims.

DETAILED DESCRIPTION OF THE INVENTION

The following detailed description is of the best currently contemplated modes of carrying out the invention. The description is not to be taken in a limiting sense, but is made merely for the purpose of illustrating the general principles of the invention, since the scope of the invention is best defined by the appended claims.

Various inventive features are described below that can each be used independently of one another or in combination with other features. However, any single inventive feature may not address any of the problems discussed above or may only address one of the problems discussed above. Further, one or more of the problems discussed above may not be fully addressed by any of the features described below.

Embodiments of the present invention generally provide methods of calibrating outflow valves in a cabin pressure control system of an aircraft. In one aspect, outflow valves may be calibrated in-flight providing improved accuracy in the positioning of the outflow valves. For example, aspects of the present invention may account for environmental conditions which may affect the movement of the outflow valves and which may affect a control unit controlling the valves.

Figure 1:
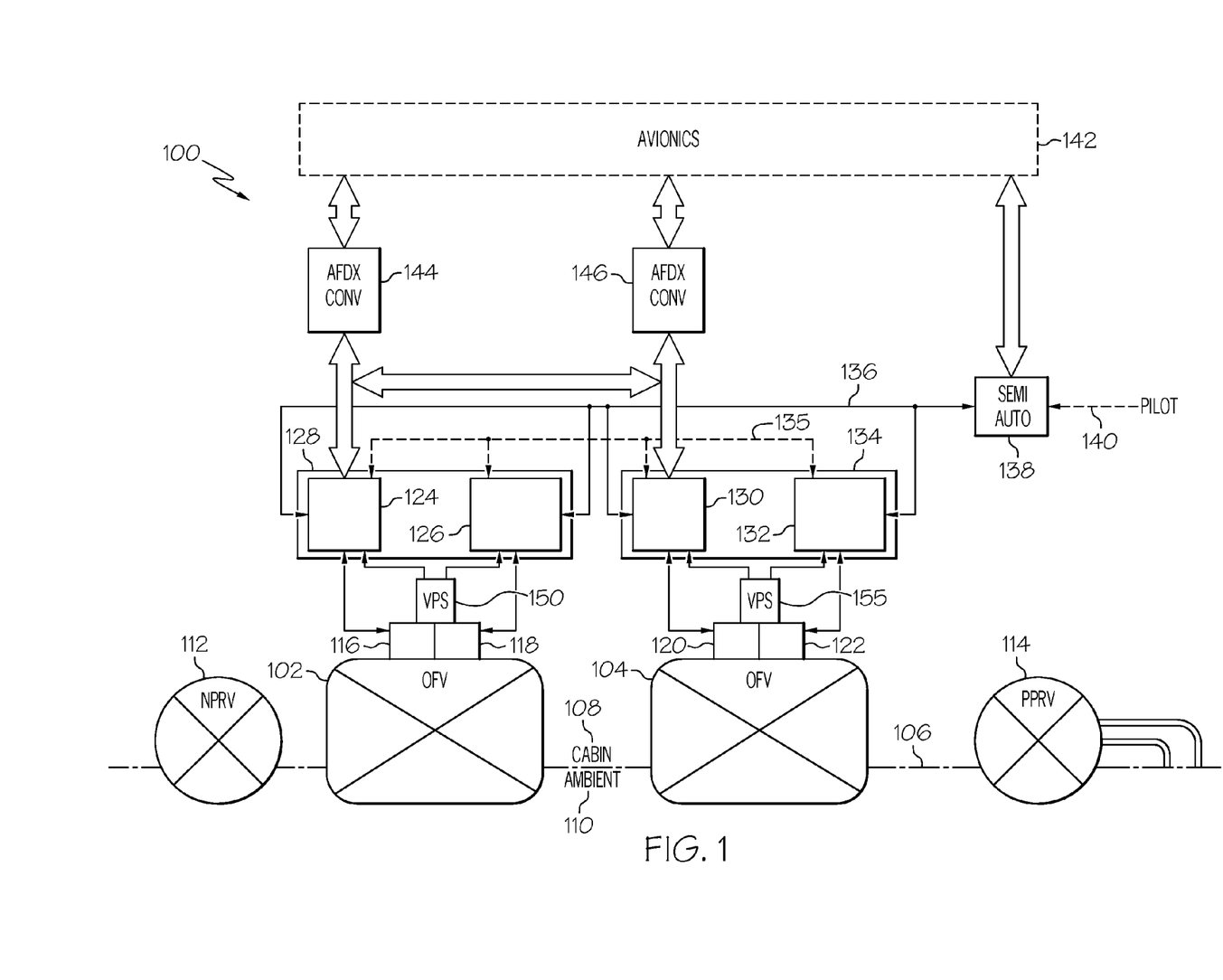
FIG. 1 is a block diagram of an outflow valve control system in accordance with an exemplary embodiment of the present invention.

FIG. 1 shows a block diagram of an outflow valve control system 100 which provides automatic cabin pressure control in accordance with one embodiment of the invention. First and second outflow valves 102 and 104 may be installed in an aircraft fuselage having a fuselage wall 106, which defines a border between the aircraft cabin air 108 and external ambient air 110. The first and second outflow valves 102, 104 may let air flow between the aircraft cabin 108 and the external ambient air 110 in a controlled manner. A negative pressure relief valve 112 may prevent the build up of an excessive negative pressure differential between the cabin and ambient air. A positive pressure relief valve 114 may prevent the build up of a positive pressure differential between the cabin and ambient air.

A first motor 116 and a first backup motor 118 may control the opening and closing of the first outflow valve 102. Likewise, a second motor 120 and a second backup motor 122 may control the opening and closing of the second outflow valve 104. The first motor 116 may be driven by a first outflow valve motor controller 124, while the first backup motor 118 may be driven by a first backup motor controller 126. Both the first outflow valve motor controller 124 and the first backup motor controller 126 may be part of a first outflow valve control unit 128.

A valve position sensor 150 may coupled to the motors 116; 118 and to the motor controllers 124, 126. The valve position sensor 150 may be disposed to detect the valve speed (degrees/sec) of the outflow valve 102 as it moves between closed and open positions. The valve position sensor 150 may also be disposed to detect the absolute or actual position of the outflow valve 102 as it moves between closed and open positions. When the valve position sensor 150 feedback indicates that the valve is near a theoretical pre-programmed target value that indicates that the valve is closed (for example, a value that represents a preset valve position feedback value that is set at the factory during manufacture of the outflow valve) and when the valve position sensor 150 indicates that the valve closing speed has stopped (for example, at approximately 0 degrees/sec), then the outflow valve 102 may be determined to be fully closed. Alternatively, when the valve position sensor 150 indicates that the valve 102 is less than a threshold value, for example 5 degrees from the theoretical value that indicates the valve is closed, and the valve is commanded closed at a fixed closing rate from the outflow valve controller 124 for a fixed period of time (for example, if starting at an indicated valve position of less than 5 degrees, a commanded closing speed of 1 degree/sec for 6 seconds would ensure that the valve is closed in the first 5 seconds with a 1 second margin to account for valve position sensor calibration error under flight conditions), then the outflow valve 102 may be determined to be fully closed.

Similarly, the second motor 120 may be driven by a second outflow valve motor controller 130, while the second backup motor 122 may be driven by a second backup motor controller 132. Both the second outflow valve motor controller 130 and the second backup motor controller 132 may be part of a second outflow valve control unit 134. In the event of a failure of the first outflow valve motor controller 124, the second outflow valve motor controller 130 may take over control of the first outflow valve 102 by means of commands sent through data bus 135 to the first backup motor controller 126.

Likewise, in the event of a failure of the second outflow valve motor controller 130, the first outflow valve motor controller 124 may take over control of the second outflow valve 104 by means of commands sent through data bus 135 to the second backup motor controller 132.

Another valve position sensor 155 may similarly be positioned between motors 120, 122 and controllers 130, 132 configured to operate similarly to valve position sensor 150.

Also, if motor 116 fails, then backup motor 118 and backup motor controller 126 may be used to control outflow valve 102 by commands sent through data bus 135 from outflow valve controller 130. Likewise, if motor 120 fails, then backup motor 122 and backup motor controller 132 may be used to control outflow valve 104 by commands sent through data bus 135 from outflow valve controller 124.

In the event of a failure of both the first and second outflow valve motor controllers 124, 130, a semiautomatic controller 138 may control both the first and second outflow valves 102, 104 by means of commands sent through data bus 136 to the first and second backup motor controllers 126, 132. Semiautomatic controller 138 may also receive commands from a pilot through an input 140 or through an avionics system 142.

The first and second outflow valve control units 124, 130 may interface with the avionics system 142 through first and second avionics data converters 144, 146, which convert avionics full-duplex switched Ethernet (AFDX) (or similar format) data into ARINC 429 (or similar) data. These converters 144, 146, are advantageously used to simplify the design of the outflow valve controllers 124, 130, as these are part of larger systems which may already have this functionality. Or, outflow valve controllers 124 and 130 can receive AFDX (or similar) inputs directly from the avionics system 142, eliminating the functions of the data conversion units 144, 146.

Figure 2:
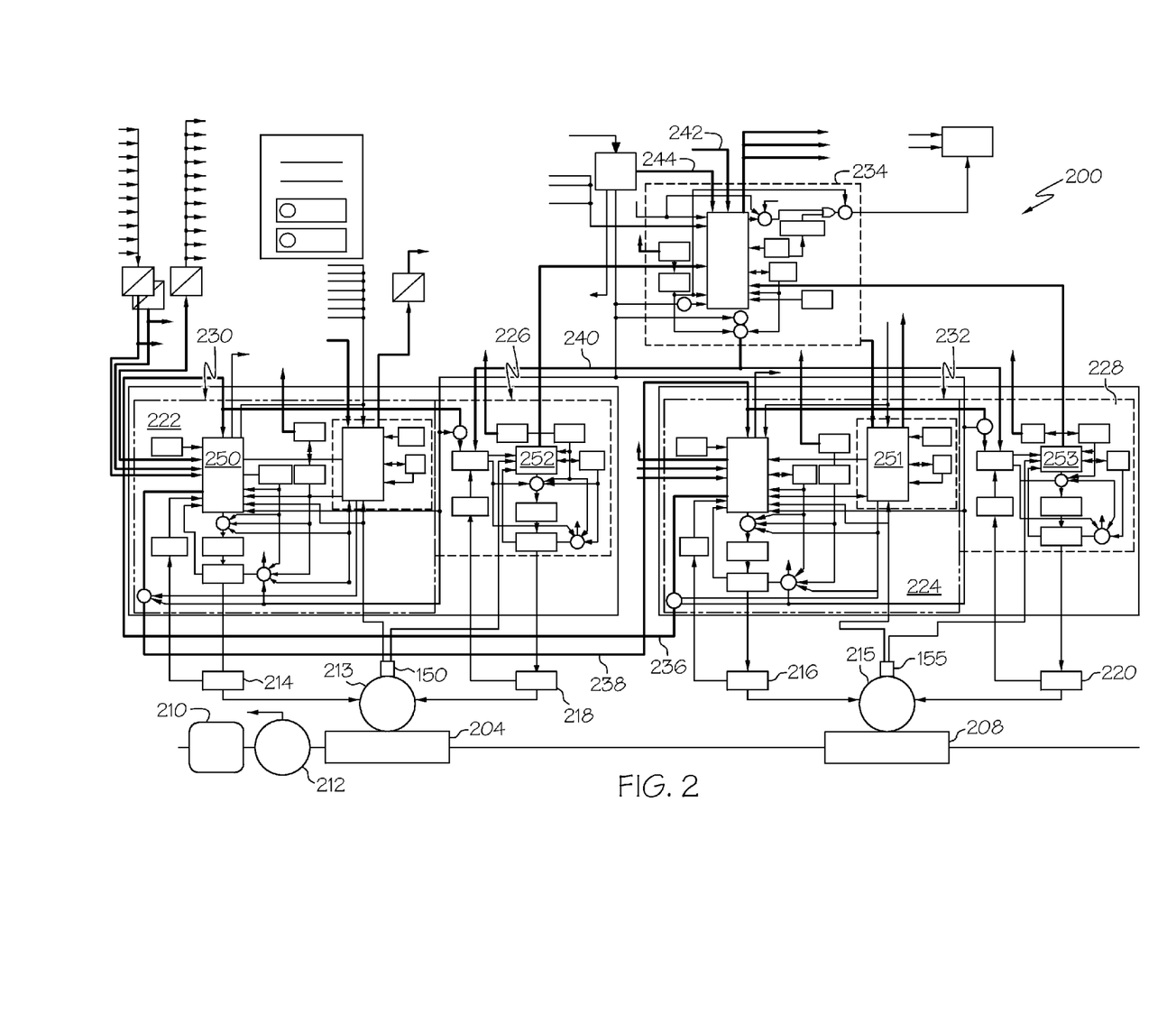
FIG. 2 is a block diagram of an outflow valve control system in accordance with another embodiment of the present invention.

FIG. 2 shows an outflow valve control system 200 in accordance with another embodiment of the present invention. A first outflow valve control unit 230 may control a first outflow valve 204 disposed in the rear of the aircraft cabin, while a second outflow valve control unit 232 may control a second outflow valve 208 disposed in the front of the aircraft. The functions of the components in the cabin pressure control system 200 may be the same as the corresponding components as described in connection with FIG. 1. In particular, cabin pressure control system 200 may include valve position sensors 150,155; first and second outflow valves 204, 208; negative pressure relief valve 210; positive pressure relief valve 212; first and second motors 214, 216; first and second backup motors 218, 220; first and second outflow valve motor controllers 222, 224; first and second summing gearboxes 213, 215; first and second backup motor controllers 226, 228; first and second outflow valve control units 230, 232; semiautomatic controller 234.

The valve position sensors 150 and 155 may each include two outputs. Valve position sensors 150 and 155 may be configured so that a first output is provided to the outflow valve motor controllers 222 and 224. The valve position sensors 150 and 155 may also be configured so that the second output of each is provided to the backup motor drivers 226 and 228.

In the first and second outflow valve motor controllers 222 and 224, there may be first and second central processing units 250 and 251, containing control logic and non-volatile memory. In the first and second backup motor controllers 226 and 228 there may be first and second backup motor controller central processing units 252 and 253, also containing control logic and non-volatile memory. First and second valve position sensors 150 and 155 may be connected to the first and second outflow valve motor controllers 222 and 224; where the first and second central processing units 250 and 251 can read the first and second valve position sensors 150 and 155 directly. Likewise, first and second valve positions sensors 150 and 155 have a second output which are connected to first and second backup motor controllers 226 and 228; where the first and second backup motor controller central processing units 252 and 253 can read the first and second valve position sensors 150 and 155 directly.

In the event of a failure of the first outflow valve motor controller 222, the second outflow valve motor controller 224 may take over control of the first outflow valve 204 by means of commands sent through data bus 236 to the first backup motor controller 226.

Likewise, in the event of a failure of the second outflow valve motor controller 224, the first outflow valve motor controller 222 may take over control of the second outflow valve 208 by means of commands sent through data bus 238 to the second backup motor controller 228. In the event of a failure of both the first and second outflow valve motor controllers 222, 224, the semiautomatic controller 234 will control both the first and second outflow valves 204, 208 by means of commands sent through data bus 240 to the first and second backup motor controllers 226, 228. Semiautomatic controller 234 may also receive commands from a pilot or from an avionics system through inputs 242 and 244.

The non-volatile memory contained within the central processing units 250, 251, 252, and 253 may store predetermined conditions for operating calibration of the outflow valves 204;208 and pre-stored values for outflow positions of the outflow valves 204;208. In one exemplary embodiment, the non-volatile memory contained in 250 and 251 may store which in-flight conditions may trigger calibration of either of the outflow valves 204;208. For example, the logic contained in central processing units 250 and 251 and 252 and 253 may include instructions for the controllers (222, 224, 226, or 228) to calibrate the position of the outflow valves 204;208 when cruising conditions are reached by the aircraft. For example, an altitude of 30,000 feet or higher may be a predetermined condition. Also for example, when the airplane maintains its cruise altitude within a given tolerance can be a pre-determined condition. Another predetermined condition may include traveling at cruise conditions for a minimum time before commencing with calibration of the outflow valves 204;208. An example of a predetermined time may be 10 minutes.

In another exemplary embodiment, the central processing units 250, 251, 252, and 253 may determine the difference between an expected theoretical position of the outflow valves 204;208 and their actual position as detected for example, by the valve position sensor 150;155. The actual position of the outflow valve 204;208 may be measured in degrees from a stored theoretical datum point in the non-volatile memory contained in 250, 251, 252, and 253. The central processing units 250, 251, 252, and 253 may also determine when the outflow valves 204;208 have stopped moving based on the valve speed falling below a threshold speed of, for example, 0.003 degrees/sec.

Figure 3:
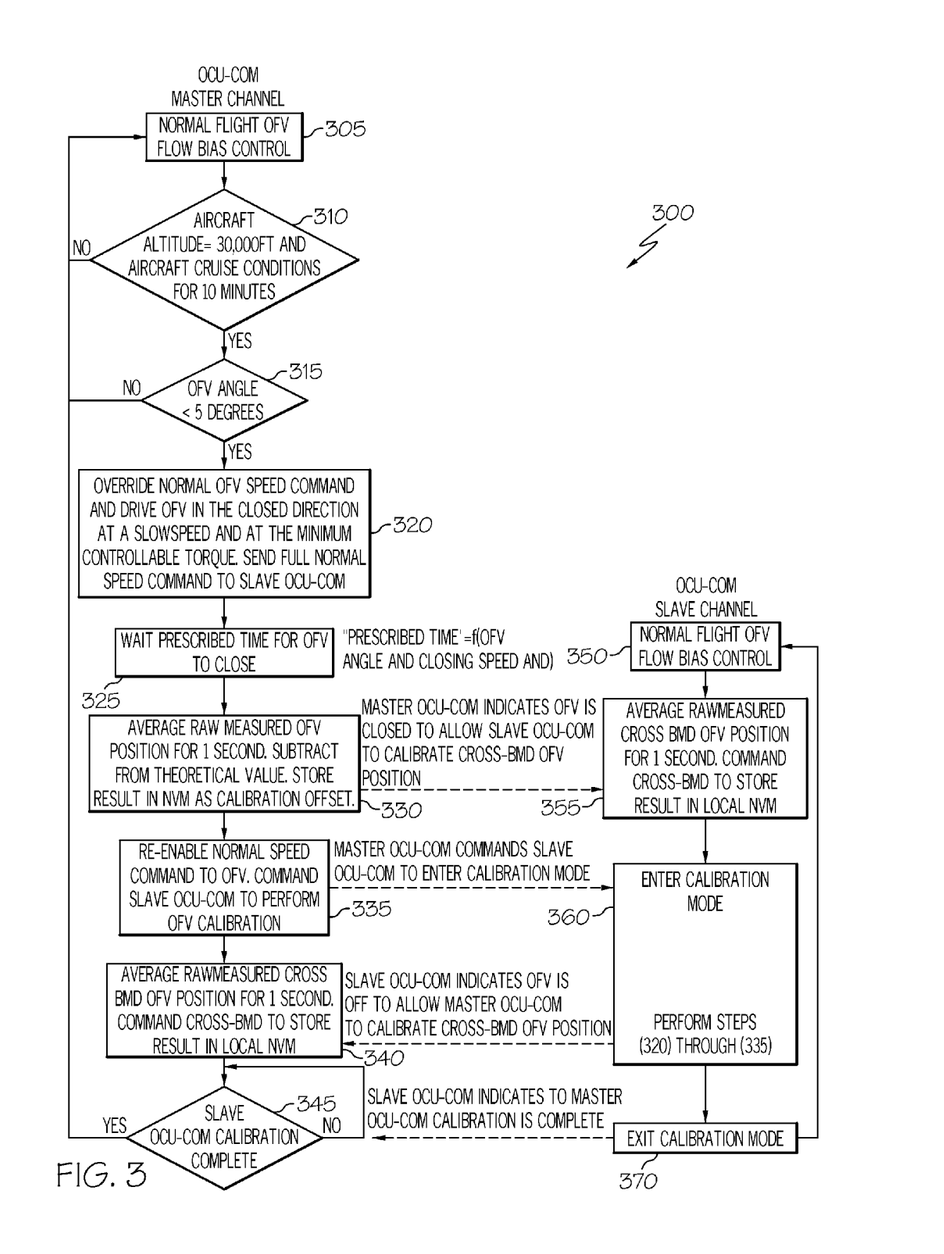
FIG. 3 is a flowchart of a series of steps for calibrating an outflow valve control system of FIGS. 1 and 2 in accordance with another embodiment of the present invention.

Referring now to FIGS. 2 and 3, the outflow valve control system 200 may be operated according to a method 300 of calibrating outflow valves 204;208 according to an exemplary embodiment shown. Additionally, steps 305 through 345 may be performed by a master command channel operating a controller, for example, the controllers 222;224, while steps 350 through 370 may be performed by a slave command channel operating for example, the controller 222;224. For sake of illustration, the following steps are described in the context of calibrating outflow valve 204 as a primary outflow valve being calibrated by the master command channel, while outflow valve 208 is a secondary outflow valve that is associated with the primary outflow valve 204 during calibration. Also for sake of illustration, the exemplary embodiment described below will refer to the controller 222 as the master command channel 222 and the controller 224 as the slave command channel 224.

It should be understood that during the cruise phase of flight, the entire exhaust air flow through the outflow valves 204 and 208 might be achieved when the outflow valves are generally positioned less than 10 degrees from the fully closed position. This is because the pressure drop across the outflow valves is significant enough to result in a pressure ratio greater than 1.87 to 1 (cabin pressure versus ambient pressure). Thus, the outflow valves, during most high altitude flight, are operated in the mostly closed position. When both outflow valves are controlled to exactly the same position, they both have the same exhaust area, and therefore both exhaust the same amount of air flow. This is considered a 50% to 50% flow bias between outflow valve 204 and 208. Depending on the amount of air flowing into the pressurized cabin, the commanded cabin pressure and cabin pressure rate of change, and the airplane altitude and airplane altitude rate of change, the outflow valves can be at various positions. Thus, outflow valve 204 and outflow valve 208 could both be at 5 degrees, 2 degrees, or any other position and maintain a 50% versus 50% flow bias control. It should be understood that if the air flow is very low, the outflow valves could even be controlling at less than 1 degree from the fully closed position. Further, it should be understood that if an operating condition changes, both the outflow valve positions should be adjusted to compensate for that condition and that the positions must be adjusted at the same time to maintain the 50% versus 50% flow bias condition.

Step 305 may include normal flight bias control. During this time, the outflow valves may be controlled according to pre-stored data in the non-volatile memory 250, 251, 252, and 253 or the controllers 222, 224. The outflow valves 204, 208 may function in a variety of positions continually opening and closing as needed to regulate cabin air pressure. In an exemplary embodiment, the flow of air through the outflow valves 204, 208 may be biased through one of the valves as the outflow valves 204, 208 are operated in tandem. In an exemplary embodiment, the outflow valves 204, 208 may be operated so that flow through one outflow valve may control how open or closed the other outflow valve should be. For example when a 20% to 80% flow bias is commanded between outflow valve 204 versus outflow valve 208, outflow valve 208 for example, is opened four times as much as outflow valve 204 causing four times more air to flow through valve 208 than valve 204. Thus, 100% of the flow is made up of 20% through outflow valve 204 and 80% through valve 208.

In step 310, the avionics system 142 (FIG. 1) may be accessed to determine the current flight status of the aircraft. A determination may be made checking if in-flight conditions are met to begin calibration of the primary outflow valve 204. For example, the method 300 may include that calibration may begin when cruise conditions are met. Exemplary cruise conditions signaling the commencement of calibration may include the aircraft reaching a stable cruising altitude and/or change rate A determination to begin calibration may also be made by checking if cruising conditions have been in effect for a minimum time (for example, at least 10 minutes).

In step 315, the outflow valve 204 may be checked to see if its angle from a closed position is less than a threshold amount. For example, it may be preferred that the outflow valve 204 may be less than 5 degrees from the closed position before moving it closed. While 5 degrees is an example, use of a small angle is beneficial to ensure that the outflow valves are in a cruise condition (low angle from closed) and that the time to calibrate the outflow valve is reduced by not having to wait on the outflow valve to close when the calibration sequence begins.

In step 320, the outflow valve 204 may be controlled to exit its nominal operating conditions and to move toward the closed position. The outflow valve 204 first motor 214 may be driven to move at for example, 350 revolutions per minute (rpm) limited under 1.5 amps of current to position the outflow valve 204 in the expected closed position without placing excess kinetic energy or torque on the valve. Meanwhile, the outflow valve 208 may move under normal speed during calibration of the outflow valve 204.

In step 325, the method 300 may wait a predetermined time for the outflow valve 204 to reach its expected closed position. The predetermined time may be based on the initial angle of the outflow valve 204 from a closed position as checked in step 315 and the speed at which the outflow valve 204 is controlled to move.

In step 350, the outflow valve 208 may operate under normal flight flow bias control as commanded by the slave command channel until step 330 is reached by the outflow valve 204.

In step 330, the actual position of the outflow valve 204 in the closed position may be measured from the valve position sensor 150. The actual position measured may be, in an exemplary embodiment, the average position of the outflow valve 204 taken over time. For example, multiple measurements of the outflow position valve 204 as detected by the valve position sensor 150 may be taken over 1 second. A calibration offset factor for the outflow valve 204 may be determined based on a difference between the actual position sensor feedback value (taken either singularly over averaged over time) and the expected theoretical value for the closed position that represents the preset position sensor feedback value of the outflow valve 204 that was set in the non-flight condition during manufacture of the outflow valve. The calibration factor may be stored in the non-volatile memory contained in central processing unit 250.

In step 355, the master command channel 222 may provide an indication to the slave command channel 224 that the outflow valve 204 is in its closed position and cross valve calibration of the outflow valve 204 should be performed for the second output of valve position sensor 150 as read by the backup motor controller 226 with the backup motor controller central processing unit 252. This may be necessary because the slave command channel 224, in an exemplary embodiment, may be the only communication path 236 to calibrate the second valve position sensor output of valve position sensor 150 as read by the backup motor driver 226 for outflow valve 204. The cross valve calibration of the outflow valve 204 may be performed by comparing the actual position of the outflow valve 204 (as measured by the second valve position sensor 150 feedback) to the theoretical position sensor value for the closed position that represents the preset position sensor feedback value of the outflow valve 204 that was set in the non-flight condition during manufacture of the outflow valve. Measurement of the actual position of the outflow valve 204 may be singular or may be an average of measured position over time. For example, multiple measurements of the second outflow valve 204 position as detected by the valve position sensor 150 may be taken over 1 second. The calibration factor is the difference between the actual measured value of the position sensor feedback and the theoretical value. The calibration factor can be stored in the non-volatile memory contained in central processing unit 252.

In step 335, the outflow valve 204 may resume normal flight operation opening and closing operating speed to regulate air pressure in the aircraft. While the outflow valve 204 resumes normal flight operation, the master command channel 222 may signal the slave command channel 224 to begin calibration of the outflow valve 208.

In step 360, the slave command channel 224 may begin calibration of the outflow valve 208. Calibration of the outflow valve 208 may be performed similar to the calibration of the outflow valve 204. The slave command channel 224 may override the normal operating function of the outflow valve 208 and move it toward an expected closed position. A predetermined time may lapse as an expected time for the outflow valve 208 to reach an expected closed position. The actual position of the outflow valve 208 may be measured by the first position sensor 155 and stored. A calibration offset factor for the outflow valve 208 may be determined based on a difference between the actual position sensor feedback (taken either singularly over averaged over time) and the expected, theoretical value for the closed position of the outflow valve 208. While the outflow valve 208 is being calibrated, the slave command channel 224 may signal the master command channel 222 that the outflow valve 208 is in its expected closed position and cross valve calibration of the outflow valve 208 should be performed.

In step 340, the cross valve calibration of the outflow valve 208 may be performed by comparing the actual position, as determined by the second valve position sensor 155 feedback of the outflow valve 208 to the theoretical value of the outflow valve 208 as determined during calibration of the valve during non-flight manufacture of the valve.

The slave command channel 224 may provide an indication to the master command channel 222 that the outflow valve 208 is in its expected closed position and cross valve calibration of the outflow valve 208 should be performed for the second output of valve position sensor 155 as read by the backup motor controller 228 with the backup motor controller central processing unit 253. This is required because the master command channel 222 is the only communication path 238 to calibrate the second valve position sensor output of valve position sensor 155 as read by the backup motor driver 228 for valve 208. The cross valve calibration of the outflow valve 208 may be performed by comparing the actual position of the outflow valve 208 (as measured by the second valve position sensor 155 feedback) to the theoretical position sensor value for the closed position of the outflow valve 208 that was determined in the non-flight condition during manufacture of the outflow valve. Measurement of the actual position of the outflow valve 208 may be singular or may be an average of measured position over time. For example, multiple measurements of the second outflow valve 208 position as detected by the valve position sensor 155 may be taken over 1 second. The calibration factor is the difference between the actual measured value of the position sensor feedback and the theoretical value. The calibration factor can be stored in the non-volatile memory contained in central processing unit 253.

In step 370, the slave command channel 224 may signal the master command channel 222 that calibration of the outflow valve 208 is complete.

In step 345, the method 300 may determine if calibration of the outflow valve 208 is completed. When completed, the method 300 may resume to step 305 where normal flight operation of the outflow valve 204 occurs. At this time, the calibration factors, stored in the non-volatile memories contained in central processing units 250, 251, 252, and 253, can be used to correct the pre-set outflow valve calibration from the factory to ensure the most accurate flow bias control possible.

Figure 4:
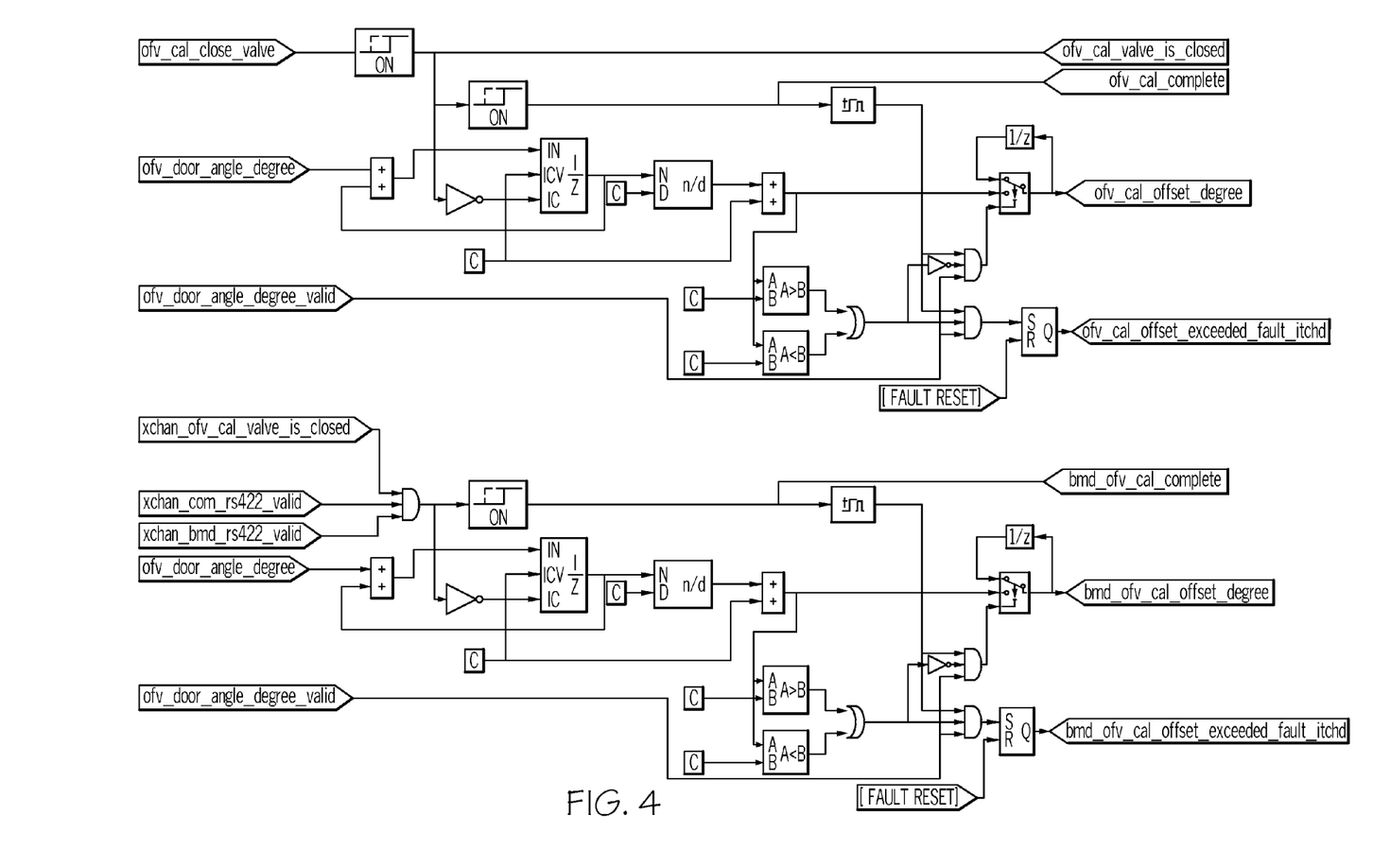
FIG. 4 is a schematic representing a series of logic decisions according to the flowchart of FIG. 3.

Referring now to FIG. 4, an exemplary logic schematic for calibrating outflow valves is shown according to an exemplary embodiment of the present invention. The logic schematic may represent a logic scheme following the method 300 of FIG. 3.

It should be understood, of course, that the foregoing relates to exemplary embodiments of the invention and that modifications may be made without departing from the spirit and scope of the invention as set forth in the following claims.

We claim:

1. A method of calibrating an outflow valve on an aircraft, including:
   determining if the aircraft has reached a predetermined cruise condition;
   moving the outflow valve until a closed position is reached, if the aircraft has reached the predetermined cruise condition;
   determining an actual position feedback value of the outflow valve while the aircraft is in the predetermined cruise condition; and
   determining an offset calibration factor from the actual position feedback value of the outflow valve relative to a theoretical value.

2. The method of claim 1 including:
   determining that the outflow valve is in the closed position; and
   determining a second offset calibration factor of another outflow valve operated in tandem with the outflow valve based on the theoretical closed position of the outflow valve.

3. The method of claim 1 wherein the predetermined cruise condition includes the aircraft's altitude in-flight.

4. The method of claim 3 wherein the predetermined cruise condition includes the aircraft's altitude within a tolerance level.

5. The method of claim 4 wherein the predetermined cruise condition is based on a predetermined time that the aircraft is at the altitude.

6. The method of claim 1 wherein the closed position is achieved based on an expected time to close the outflow valve.

7. The method of claim 1 wherein the closed position is determined based on a valve speed of the outflow valve and a detection of movement of the outflow valve falling below a threshold level.

8. The method of claim 1 wherein the theoretical closed position feedback value is based on a preset manufacturer stored value.

9. A method of calibrating outflow valves on an aircraft, including:
   controlling a position of a first outflow valve using a first command channel;
   determining if the aircraft is in-flight;
   moving the first outflow valve with the first command channel until a closed position is reached while the aircraft is in-flight, wherein the closed position is based on a theoretical value stored in non-volatile memory;
   receiving an actual position feedback of the first outflow valve; and
   determining an offset calibration factor for the first outflow valve based on a difference between the actual position feedback of the first outflow valve and the theoretical value that represents the outflow valve in the closed position.

10. The method of claim 9 including storing the offset calibration factor in nonvolatile memory accessible by the first command channel.

11. The method of claim 9 including:
    indicating to a second command channel that the first outflow valve is closed;
    indicating to a first backup motor channel to determine the actual position feedback of the first outflow valve;
    determining the actual position feedback of the first outflow valve by a first backup motor channel; and
    determining another offset calibration factor for the first outflow valve by the first backup motor channel based on a difference between the actual position feedback of the first outflow valve and the theoretical value representing the closed position of the first valve.

12. The method of claim 11 including:
    indicating to a second command channel that the first outflow valve is calibrated via the first command channel;
    moving the first outflow valve with the first command channel to a position associated with a second outflow valve;
    moving the second outflow valve with the second command channel until a closed position for the second outflow valve is reached, wherein the closed position for the second outflow valve is based on a theoretical value stored in non-volatile memory; and
    determining an offset calibration factor for the second outflow valve based on a difference between an actual position feedback of the second outflow valve and the theoretical value that represents the second outflow valve in the closed position.

13. The method of claim 12 including:
    indicating to the first command channel that the second outflow valve is closed;
    indicating to a second backup motor channel to determine the actual position feedback of the second outflow valve;
    determining the actual position feedback of the second outflow valve by the second backup motor channel; and
    determining an offset calibration factor for the second outflow valve by the second backup motor channel based on a difference between the actual position feedback of the second outflow valve and the theoretical value representing the closed position of the second outflow valve.

14. The method of claim 9 wherein the offset calibration factor for the first outflow valve is based on an average of measurements of the actual position of the first outflow valve.

15. The method of claim 9 wherein the theoretical closed position feedback value is based on a preset manufacturer stored value.

16. The method of claim 9 wherein the closed position is determined based on a valve speed of the first outflow valve and a detection of movement of the first outflow valve falling below a threshold level.

17. An outflow valve control system in an aircraft including:
    an outflow valve on the aircraft;
    a motor coupled to the outflow valve;
    a valve position sensor coupled to the outflow valve;
    an outflow valve controller configured to control the motor and read the valve position sensor; and
    a central processing unit (CPU) including control logic and non-volatile memory connected to the controller, configured to:
    control the controller to move the outflow valve into a closed position;
    read the valve position sensor;
    determine if the outflow valve is in the closed position;
    determine an actual valve position sensor feedback value of the outflow valve in the closed position when the aircraft is in-flight;
    determine an offset calibration factor of the outflow position valve based on a difference between a theoretical valve position sensor feedback value for the closed position and the actual valve position sensor feedback value;
    store the calibration factor in the non-volatile memory; and move the outflow valve according to the calibration offset factor.

18. The outflow valve control system of claim 17 including:
- a backup motor coupled to the outflow valve; and
- a first backup controller configured to control the backup motor, wherein the CPU including control logic and non-volatile memory is configured to control the position of the outflow valve with the backup controller using the offset calibration factor.

19. The outflow valve control system of claim 17 wherein the CPU is configured to determine valve speed from the valve position sensor.

20. The outflow valve control system 17 wherein the CPU is configured to determine when the valve position sensor detects the outflow valve has stopped moving.

* * * * *